(12) United States Patent
Zhu et al.

(10) Patent No.: US 9,256,226 B1
(45) Date of Patent: *Feb. 9, 2016

(54) OBJECT BOUNDING BOX ESTIMATION

(71) Applicant: Google Inc., Mountain View, CA (US)

(72) Inventors: Jiajun Zhu, Sunnyvale, CA (US); Dirk Haehnel, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,966

(22) Filed: Apr. 15, 2014

Related U.S. Application Data

(63) Continuation of application No. 13/361,023, filed on Jan. 30, 2012, now Pat. No. 8,736,463.

(51) Int. Cl.
| | | |
|---|---|---|
| *G01C 22/00* | (2006.01) | |
| *G05D 1/00* | (2006.01) | |
| *G05D 1/02* | (2006.01) | |
| *G06K 9/00* | (2006.01) | |
| *B60K 31/00* | (2006.01) | |

(52) U.S. Cl.
CPC .......... *G05D 1/0088* (2013.01); *B60K 31/0008* (2013.01); *G05D 1/024* (2013.01); *G06K 9/00805* (2013.01); *G06T 2207/30261* (2013.01)

(58) Field of Classification Search
CPC .......... B60K 31/0008; G06K 9/00805; G06K 9/00791; G06T 2207/30261
USPC ............... 701/26, 1; 340/933, 937; 180/169; 382/103, 104; 348/148
See application file for complete search history.

(56) References Cited

U.S. PATENT DOCUMENTS

| | | | |
|---|---|---|---|
| 5,809,161 A | 9/1998 | Auty et al. | |
| 8,736,463 B1 * | 5/2014 | Zhu et al. | 340/933 |
| 2003/0114964 A1 | 6/2003 | Strumolo | |
| 2008/0285799 A1 | 11/2008 | Chiu et al. | |
| 2011/0025548 A1 | 2/2011 | Nickolaou | |
| 2012/0224060 A1 | 9/2012 | Gurevich et al. | |

* cited by examiner

*Primary Examiner* — John A Tweel, Jr.
(74) *Attorney, Agent, or Firm* — Lerner, David, Littenberg, Krumholz & Mentlik, LLP

(57) ABSTRACT

Aspects of the disclosure relate generally to maneuvering autonomous vehicles. Specifically, the vehicle may use a laser to collect scan data for a section of roadway. The vehicle may access a detailed map including the section of the roadway. A disturbance indicative of an object and including a set of data points data may be identified from the scan data based on the detailed map. The detailed map may also be used to estimate a heading of the disturbance. A bounding box for the disturbance may be estimated using the set of data points as well as the estimated heading. The parameters of the bounding box may then be adjusted in order to increase or maximize the average density of data points of the disturbance along the edges of the bounding box visible to the laser. This adjusted bounding box may then used to maneuver the vehicle.

20 Claims, 13 Drawing Sheets

OBJECT BOUNDING BOX ESTIMATION

CROSS-REFERENCE TO RELATED APPLICATIONS

The present application is a continuation of U.S. patent application Ser. No. 13/361,023, filed Jan. 30, 2012, the disclosure of which is incorporated herein by reference.

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are typically equipped with various types of sensors in order to detect objects in the surroundings. For example, autonomous vehicles may include lasers, sonar, radar, cameras, and other devices which scan and record data from the vehicle's surroundings. These devices in combination (and in some cases alone) may be used to identify the shape and outline objects in a roadway and safely maneuver the vehicle to avoid the identified objects. This detection and identification is a critical function for autonomous vehicles but may be very difficult because the sensor data may include vast amounts of information. For example, laser sensors from a single autonomous vehicle may collect tens of thousands of data points off of a single object, such as another car. Processing such a large amount of data points in three dimensions is very time consuming and impractical for real time use of the data.

BRIEF SUMMARY

One aspect of the disclosure provides a method for maneuvering a vehicle. The method includes receiving sensor data from at least one sensor. The sensor data includes a plurality of data points, and each data point represents a location and elevation of a particular surface associated with a section of roadway. A detailed map of the section of roadway is accessed and used to identify a disturbance in the sensor data indicative of an object in the section of roadway. The disturbance is associated with a set of data points. A processor estimates a bounding box for the disturbance based on the detailed map. The set of data points of the disturbance is projected onto a 2-dimensional intensity map within the estimated bounding box. Edges of the bounding box visible to the at least one sensor are identified and a parameter of the estimated bounding box is adjusted in order to increase a number of data points of the set of data points along the identified edges. The adjusted bounding box is used to maneuver the vehicle.

In one example, the at least one sensor includes a laser and the sensor data includes data points generated from the laser scanning the section of the roadway. In another example, the detailed map includes information indicating locations of the surface of the roadway, and the disturbance is identified by selecting data points that are associated with a location at or above a threshold distance above the locations of the surface of the roadway. In another example, the method also includes estimating a heading of the disturbance based on the detailed map. In another example, the detailed map includes information indicating a direction of a lane and estimating the heading of the disturbance is based on the information indicating the direction of the lane. In another example, the parameter is adjusted in order to maximize the number of data points of the set of data points along the identified edges. In another example, the parameter of the bounding box includes at least one of a heading, a position, an orientation, and a dimension.

Another aspect of the disclosure provides a device for maneuvering a vehicle. The device includes memory storing a detailed map of the section of roadway. The device also includes a processor coupled to the memory. The processor is operable to receive sensor data from at least one sensor. The sensor data includes a plurality of data points, and each data point represents a location and elevation of a particular surface associated a section of roadway. The processor is also operable to identify a disturbance in the sensor data indicative of an object in the section of roadway based on the detailed map. The disturbance is associated with a set of data points. The processor is operable to estimate a bounding box for the disturbance based on the detailed map, project the set of data points of the disturbance onto a 2-dimensional intensity map within the estimated bounding box, identify edges of the bounding box visible to the at least one sensor, and adjust a parameter of the estimated bounding box in order to increase a number of data points of the set of data points along the identified edges. The processor uses the adjusted bounding box to maneuver the vehicle.

In one example, the device also includes the at least one sensor. In another example, the at least one sensor includes a laser and the sensor data includes data points generated from the laser scanning the section of the roadway. In another example, the memory further stores information indicating locations of the surface of the roadway, and the processor is also operable to identify the disturbance by selecting data points that are associated with a location at or above a threshold distance above the locations of the surface of the roadway. In another example, the processor is also operable to estimate a heading of the disturbance based on the detailed map. In another example, the memory also stores information indicating a direction of a lane and the processor is also operable to estimate the heading of the disturbance based on the information indicating the direction of the lane. In another example, the processor is also operable to adjust the parameter in order to maximize the number of data points of the set of data points along the identified edges. In another example, the processor is also operable to adjust the parameter of the bounding box by adjusting at least one of a heading, a position, an orientation, and a dimension of the bounding box.

A further aspect of the disclosure provides a tangible computer-readable storage medium on which computer readable instructions of a program are stored. The instructions, when executed by a processor, cause the processor to perform a method of maneuvering a vehicle. The method includes receiving sensor data from at least one sensor. The sensor data includes a plurality of data points, and each data point represents a location and elevation of a particular surface associated a section of roadway. A detailed map of the section of roadway is accessed and used to identify a disturbance in the sensor data indicative of an object in the section of roadway. The disturbance is associated with a set of data points. A processor estimates a bounding box for the disturbance based on the detailed map. The set of data points of the disturbance is projected onto a 2-dimensional intensity map within the estimated bounding box. Edges of the bounding box visible to the at least one sensor are identified and a parameter of the estimated bounding box is adjusted in order to increase a number of data points of the set of data points along the identified edges. The adjusted bounding box is used to maneuver the vehicle. In one example, the at least one sensor includes a laser and the sensor data includes data points generated from the laser scanning the section of the roadway. In another example, the detailed map includes information indicating locations of the surface of the roadway, and the disturbance is identified by selecting data points that are associated with a location at or above a threshold distance above the locations of the surface of the roadway. In another example, the method also includes estimating a heading of the disturbance based on the detailed map. In another example, the detailed map includes information indicating a direction of a lane and estimating the heading of the disturbance is based on the information indicating the direction of the lane. In another example, the parameter is adjusted in order to maximize the number of data points of the set of data points along the identified edges. In another example, the parameter of the bounding box includes at least one of a heading, a position, an orientation, and a dimension.

DETAILED DESCRIPTION

In one aspect of the disclosure, a laser mounted on an autonomous vehicle may collect scan data for the autonomous vehicle's surroundings including a section of a roadway. The vehicle may also access a detailed map including the section of the roadway, for example, based on data received from a global positioning component. A disturbance in the scan data may be identified based on the detailed map. The disturbance includes a set of data points indicative of an object in the section of the roadway. The detailed map may also be used to estimate a heading of the disturbance.

A bounding box for the set of data points may be estimated using the set of data points of the disturbance as well as the estimated heading. The bounding box may include parameters such as position, heading, and dimensions. The set of data points may be projected onto a two-dimensional ("2D") intensity map within the bounding box. The visible edges of the bounding box, or those edges which would be visible to the laser, may be identified. The parameters of the bounding box may be adjusted in order to increase or maximize the average density of data points of the set of data points of the disturbance along the identified visible edges. This adjusted bounding box may be then used to maneuver the vehicle.

Figure 1:
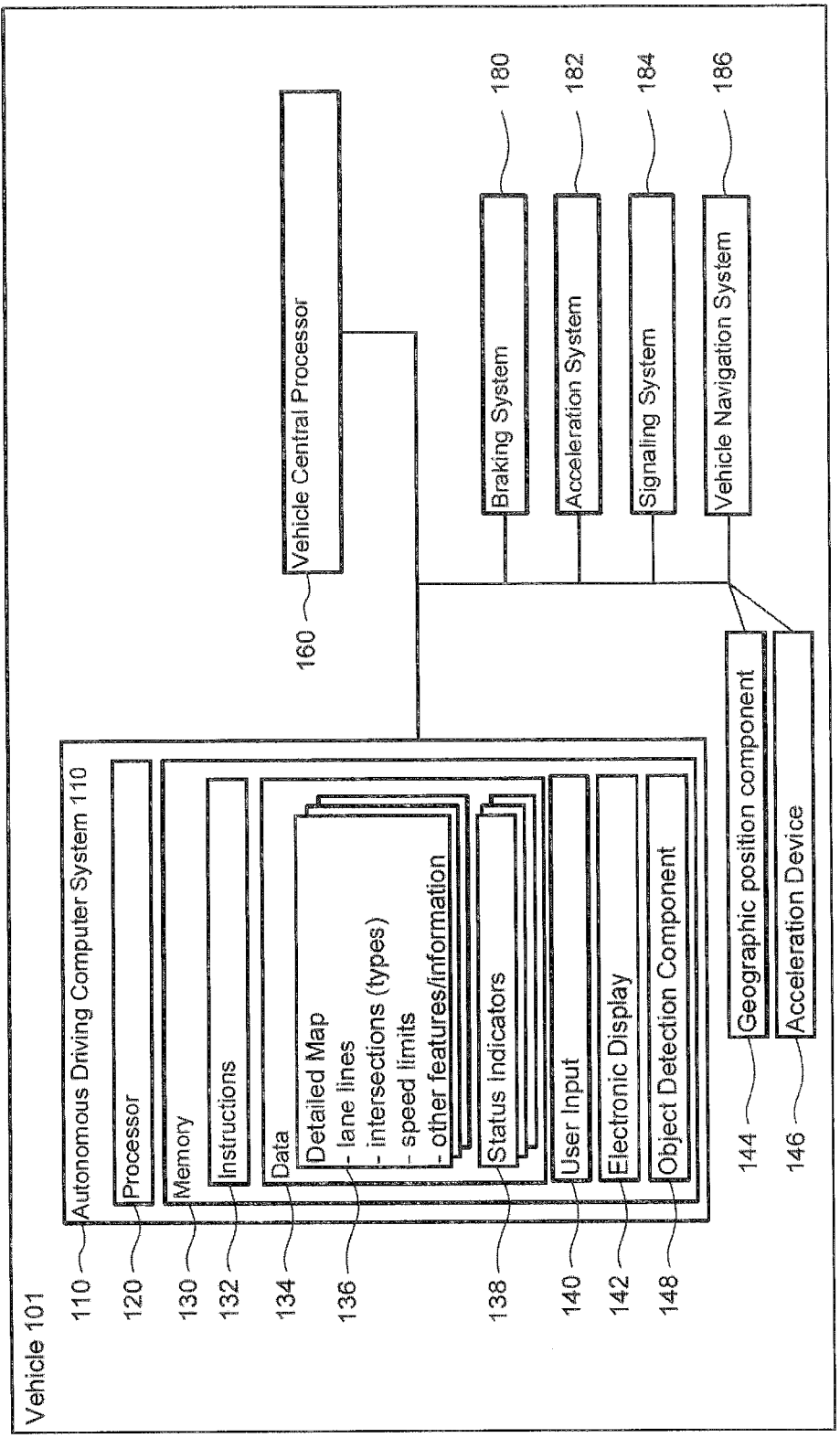
FIG. 1 is a functional diagram of a system in accordance with an implementation.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various of the aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may have all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g. a video camera) for gathering the explicit (e.g. a gesture) or implicit (e.g. "the person is asleep") information about the states and desires of a person.

Figure 2:
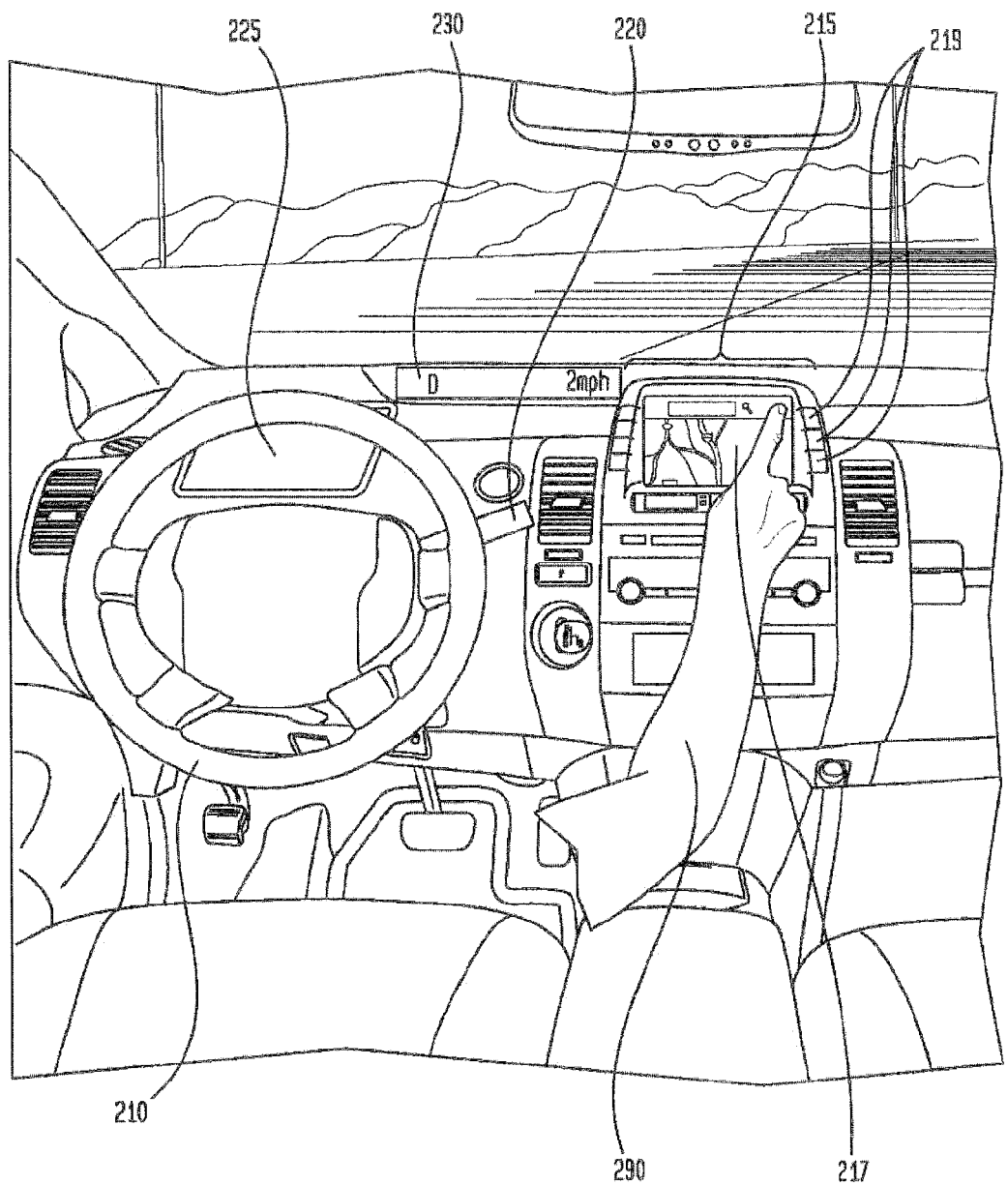
FIG. 2 is an interior of an autonomous vehicle in accordance with an implementation.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus 138 (see FIG. 1), such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may be capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101.

In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3:
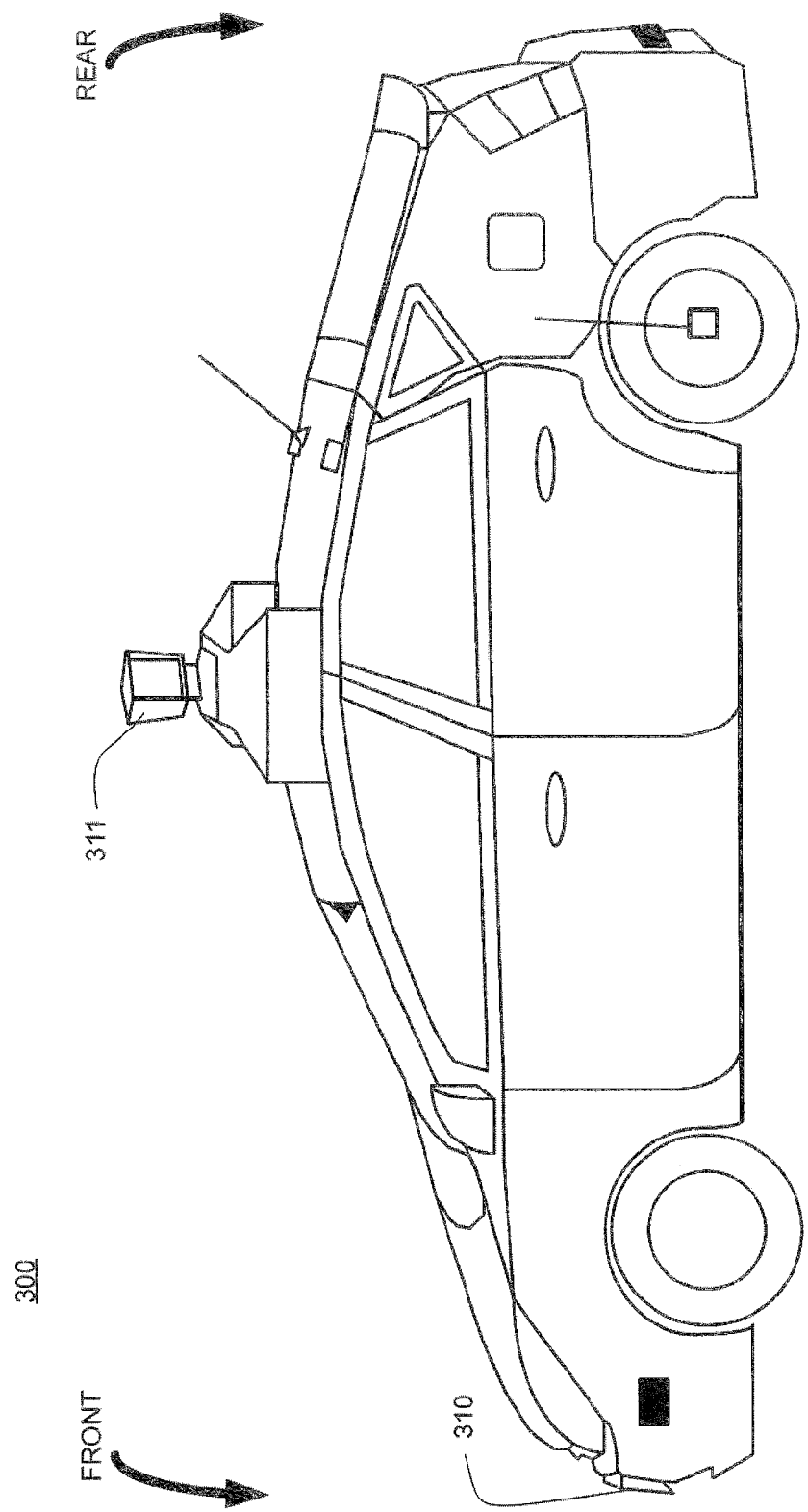
FIG. 3 is an exterior of an autonomous vehicle in accordance with an implementation.

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location. As shown in FIG. 3, small passenger vehicle 300 may include lasers 310 and 311, mounted on the front and top of the vehicle, respectively. The lasers may include commercially available lasers such as the Velodyne HDL-64 or other models. In one example, laser 310 may have a range of 150 meters, a thirty degree vertical field of view, and a thirty degree horizontal field of view. Laser 311 may have a range of 50-80 meters, a thirty degree vertical field of view, and a 360 degree horizontal field of view. The laser may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current position of another car) and other data (e.g., comparing a position with previously-stored lane-specific map data to determine whether the other car is within a turn lane).

Again, although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

In addition to the operations described above and illustrated in the figures, various operations will now be described. It should be understood that the following operations do not have to be performed in the precise order described below. Rather, various steps can be handled in a different order or simultaneously, and steps may also be added or omitted.

A vehicle including one or more lasers may be driven along a roadway. As the laser is moved along, it may collect data points including range and intensity information for the same location (point or area) from several directions and/or at different times. For example, each data point may include a location component and an elevation component: (x,y,z).

Figure 4:
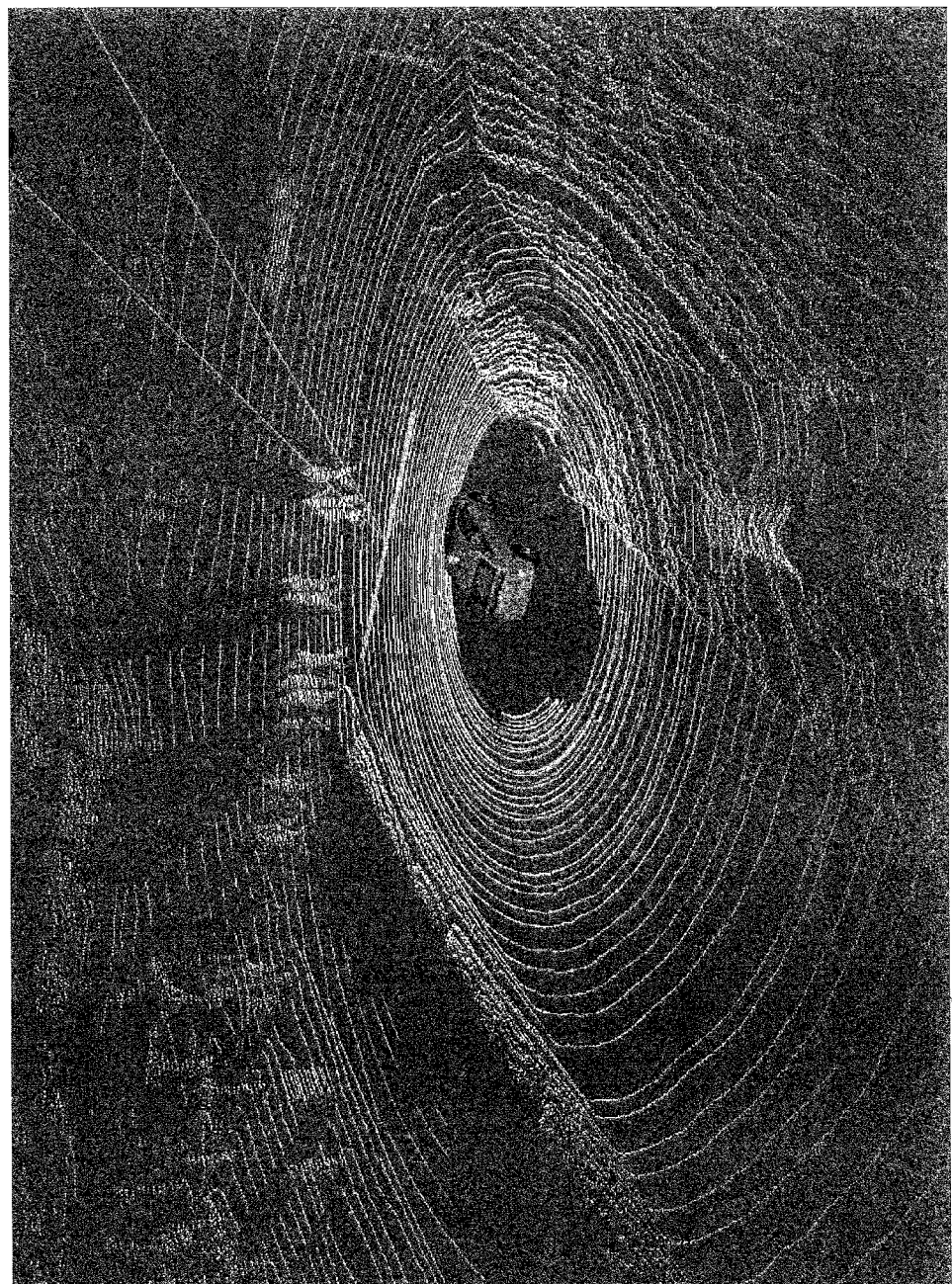
FIG. 4 is a diagram of laser data in accordance with an implementation.

FIG. 4 depicts an exemplary image 400 of vehicle 300 approaching an intersection. The image was generated based on a set of laser data collected by the vehicle's lasers for a single 360 degree scan of the vehicle's surroundings. The white lines represent how the laser "sees" its surroundings. For example, the laser data may include the outline, shape and distance from vehicle 300 of various objects such as people 410, vehicles 420, and curb 430.

Figure 5:
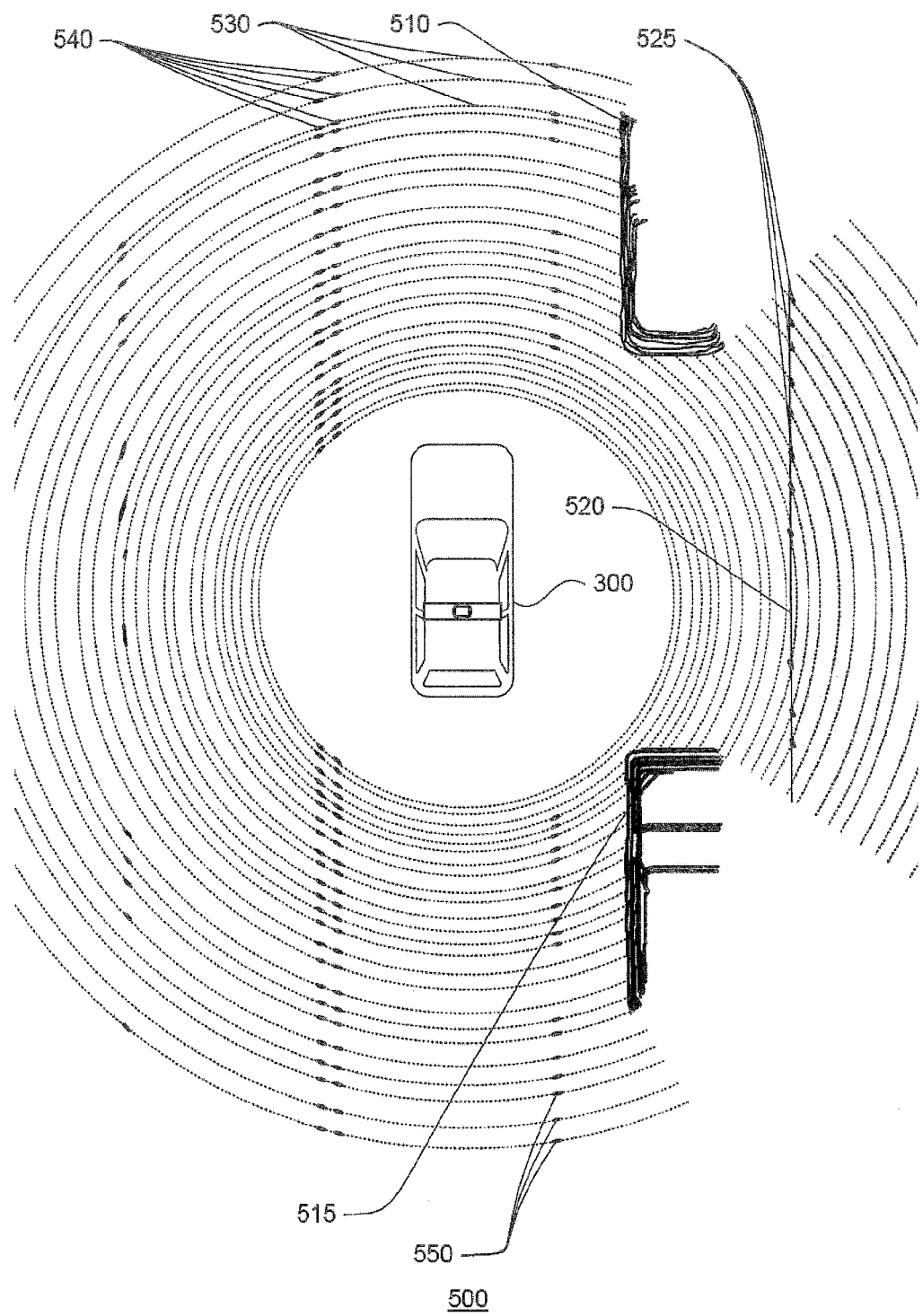
FIG. 5 is another diagram of laser data in accordance with an implementation.

FIG. 5 depicts another example 500 of the laser scan data collected for a single scan. In this example, vehicle 300 is depicted driving along a section of roadway and laser lines 530 indicate the area around the vehicle scanned by the laser.

The laser lines may indicate the shape and location of other items in the vehicle's surroundings. For example, reference line 520 connects the distance and location readings 525 of the edge of the curb and is not part of the laser data. The laser data may also include indications of the distance and location of lane lines. FIG. 5 also includes distance and location readings 540 representing solid double yellow lane lines as well as distance and location readings 550 representing white lane lines. In this example, the data collected by the laser also includes two other vehicles that appear as disturbances 510 and 515 in the laser lines 530.

Figure 6:
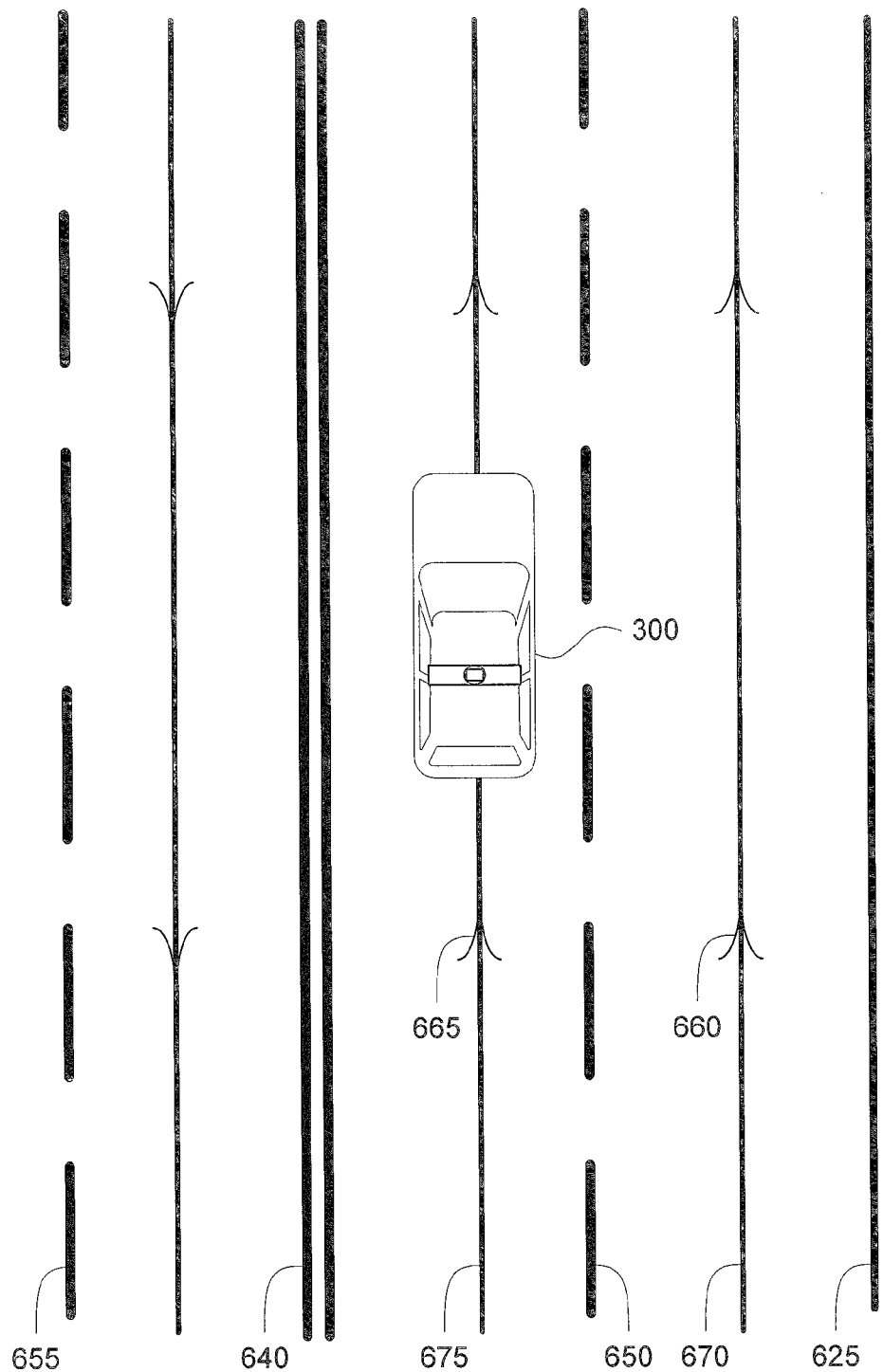
FIG. 6 is a diagram of a detailed map in accordance with an implementation.

As noted above, the autonomous vehicle may also access to a detailed map of the roadway. The pertinent section of the detailed map may be identified based on various geographic positioning devices such as the geographic positioning component. FIG. 6 depicts a detailed map 600 including the same example section of roadway (as well as information outside of the range of the laser) being traveled by vehicle 300 in FIG. 5. The detailed map of the section of roadway includes information such as the location of curb 625, double yellow lane lines 640, and white lane lines 650, 655. The example of FIG. 6 also includes the location of vehicle 300 at for the time that the laser scan data of FIG. 5 was captured, though this information may not necessarily be included in the detailed map.

The detailed map may also include information indicating the direction of lanes. For example, detailed map 600 includes direction arrows 660 and 665 that indicate the direction of travel for each of the lanes of the section of the roadway. Direction arrows 660 indicate the direction of travel for path 670 which follows the lane located between curb 625 and white lane lines 650. Direction arrows 665 indicates the direction of travel for path 675 which follows the lane located between white lane lines 650 and double yellow lane lines 640.

Figure 7:
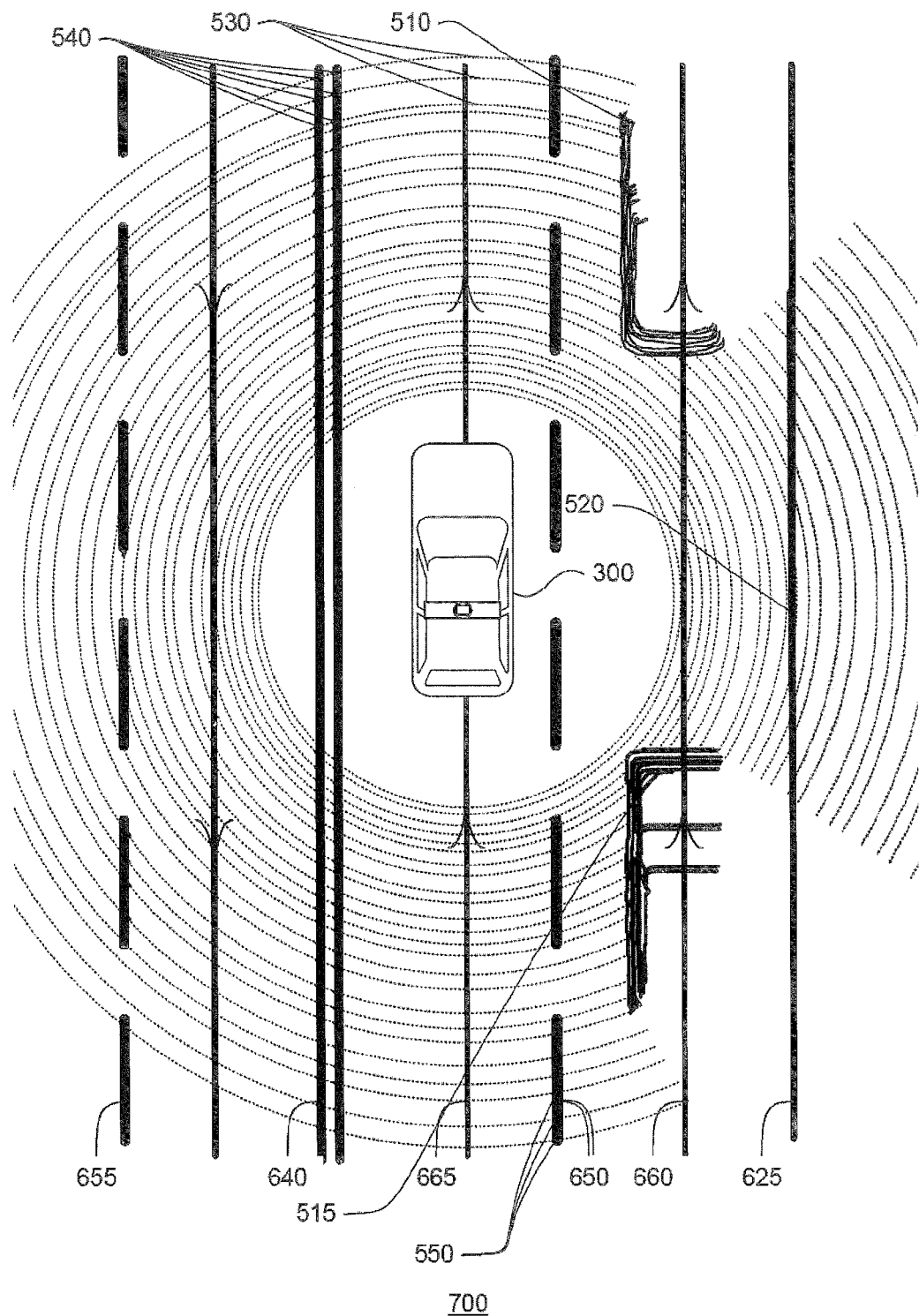
FIG. 7 is a diagram combining a detailed map and laser data in accordance with an implementation.

The detailed map may then be compared to the laser scan data. For example, FIG. 7 depicts an example 700 of both the detailed map information as well as the laser scan data for the section of roadway. As can be seen, the laser scan data and the detailed map correspond quite well. For example, location readings 540 correspond to the location of the double yellow lines 640 and location readings 550 correspond to the location of the while lane line 650.

By comparing the detailed map to the laser scan data, objects that are not included in the detailed map may be observed. For example, vehicle 300 may be able to identify the location of objects in the vehicle's surroundings by identifying groups of data points that are located at least some threshold distance above the location of the ground (or roadway) in the detailed map. Thus, in the example of FIG. 7, vehicle 300 may identify disturbances 510 and 515 as objects in the roadway as some portion of the data points are located at or above a threshold distance such as 15 cm above the surface of the roadway (as indicated from detailed map 600). These other vehicles may not be immediately identified as actual vehicles, but simply as objects in the roadway.

The approximate location of the groups of data points indicating an object in the roadway may be used to determine a possible heading of the disturbance. For example, disturbance 510 and 515 are located between curb 525 and white lane line 550. Thus, the vehicle may assume that the objects are moving in the direction of the lane (here, the same direction as vehicle 300).

Figure 8:
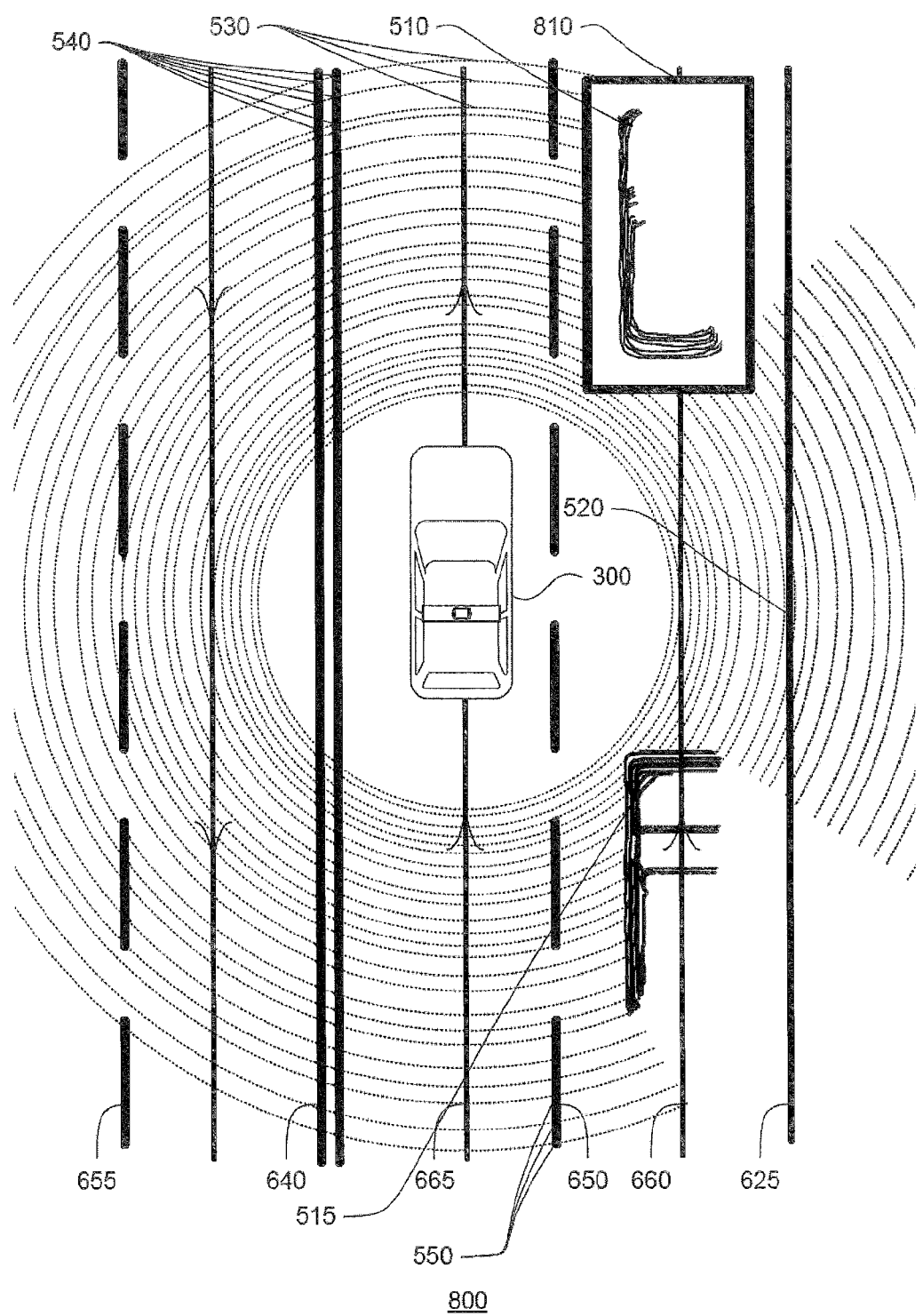
FIG. 8 is another diagram combining a detailed map and laser data in accordance with an implementation.

The possible direction of travel and the group of data points indicating an object in the roadway may be used to estimate a bounding box for the disturbance. For example, the bounding box may be drawn to capture data points that are at or above the threshold distance from the surface of the roadway. Thus, the bounding box may be associated with a position and dimensions. For example, as shown in example 800 of FIG. 8 an approximate bounding box 810 has been drawn around the data points of disturbance 510.

The bounding box may also be associated with a heading, obtain the heading from various sources. For example, a bounding box located within or partially within the roadway may be associated with a heading based on the direction of the roadway in the detailed map. In another example, the heading may be determined by reviewing multiple sets of laser data taken over time.

Figure 9A:
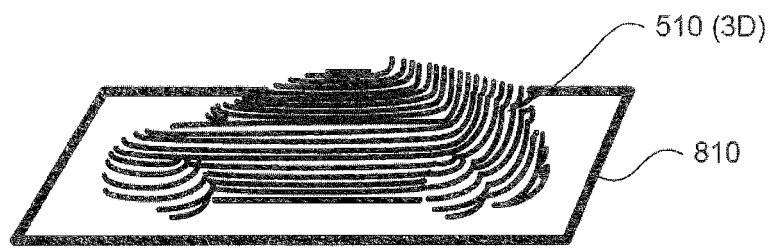
FIGS. 9A-9C are diagrams of laser data in accordance with an implementation.

The laser scan data may be used to draw a three-dimensional ("3D") image of the object. For example, as shown in FIG. 9A, the data points of disturbance 510 have been drawn in 3D in the bounding box 810.

Figure 9B:
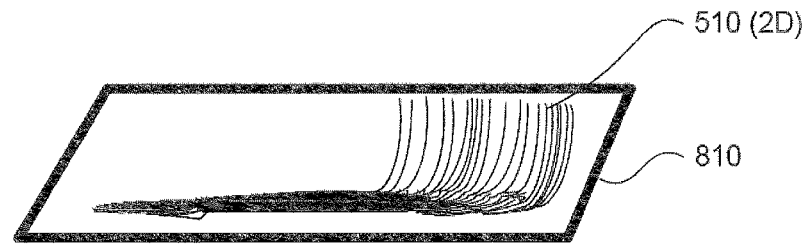

The 3D image data points may then be projected onto a 2D intensity map. The Z (or height coordinate) may be dropped or ignored so that only the X,Y locations of the data points are used. For example, as shown in FIG. 9B, the data points of disturbance 510 have been projected onto the 2D outline of the bounding box 810. In some examples, the intensity of the pixels of the 2D map may indicate how many points are included in the pixel.

Figure 9C:
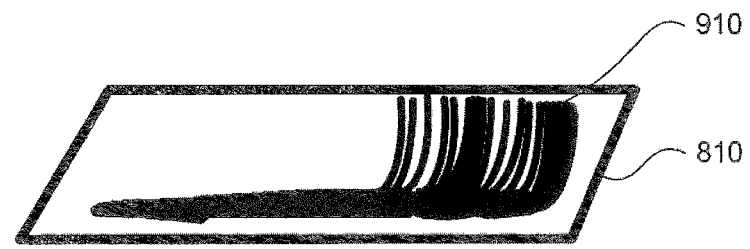
Figure 10:
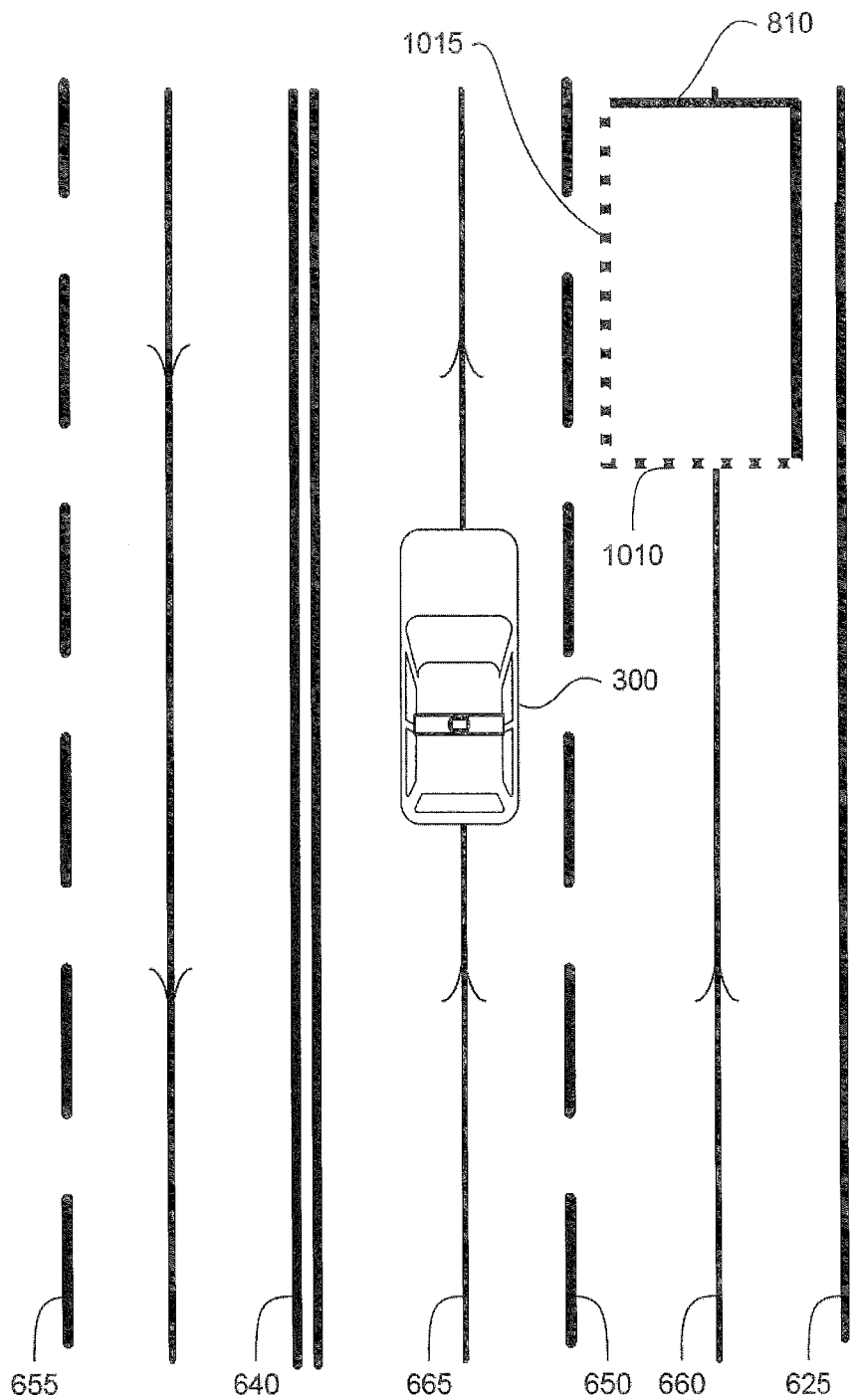
FIG. 10 is a diagram of example data in accordance with an implementation.

In some examples, the data points of the 2D intensity map may be blurred. For example, an image-blurring filter that uses a Gaussian function may be applied to the 2D intensity map. The blurring may make the map smoother and allow for a small degree of error in the laser scan data. For example, as shown in FIG. 9C, the data points of disturbance 510 have been "blurred" to generate disturbance 910. The location of the bounding box with respect to the vehicle may be used to identify which sides or edges of the bounding box would be visible to the vehicle's laser. For example, as shown in FIG. 10, bounding box 810 is shown at its approximate location relative in detailed map 600. The edges of the bounding box 810 visible to the vehicle's laser includes edges 1010 and 1015.

Figure 11:
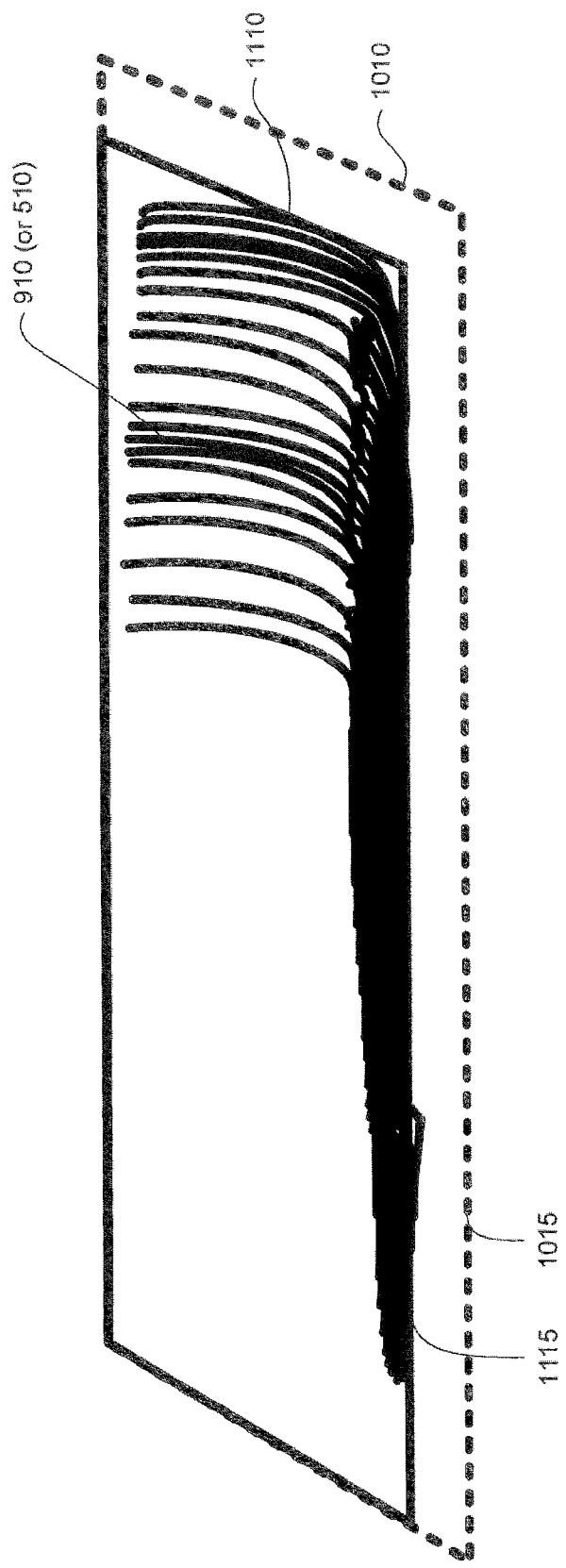
FIG. 11 is another diagram of laser data in accordance with an implementation.
Figure 12:
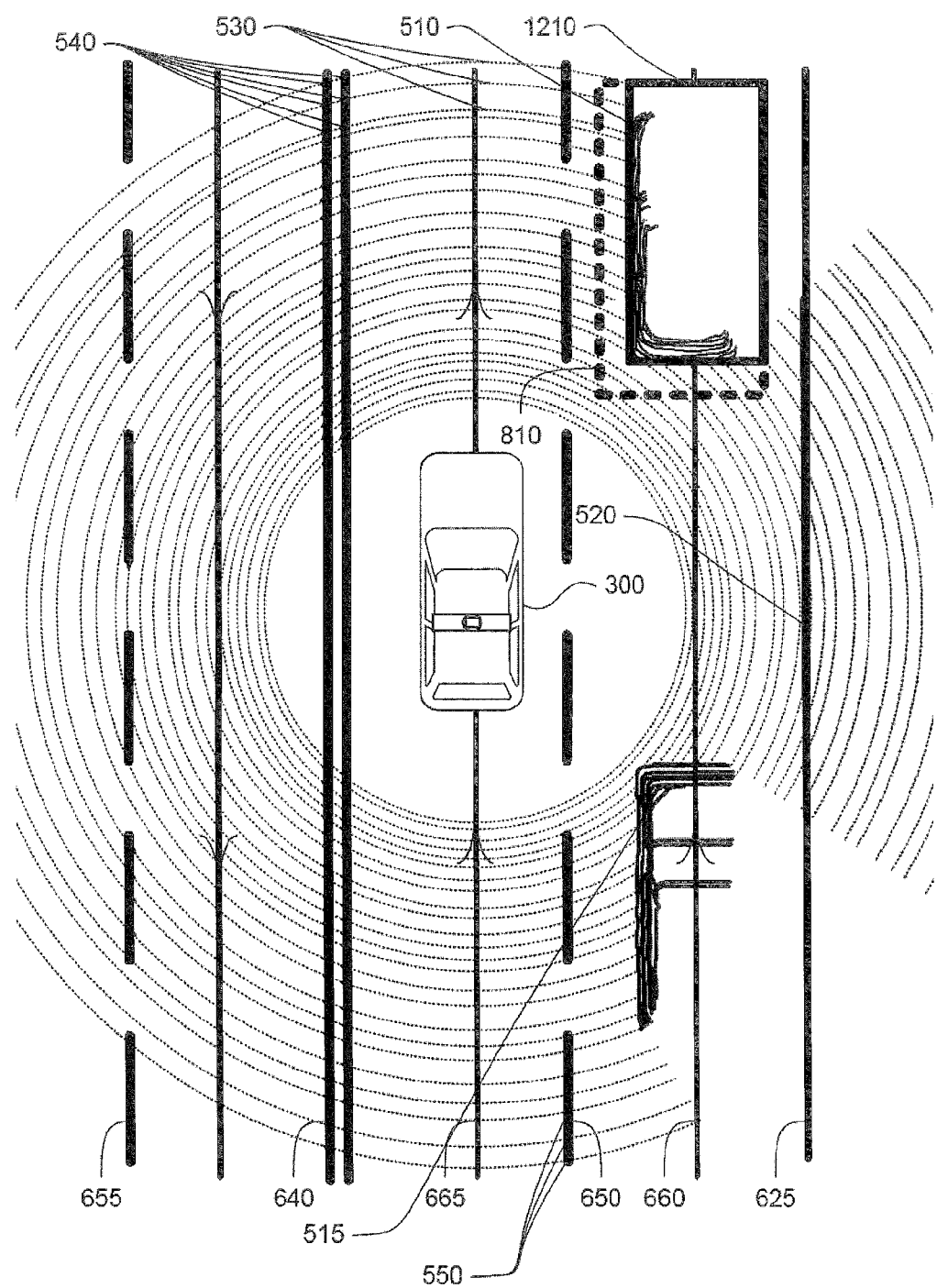
FIG. 12 is a diagram combining a detailed map and laser data in accordance with an implementation.

The parameters of the bounding box may then be adjusted to increase the accuracy of the bounding box. The position, heading, orientation, and dimensions of the bounding box may be adjusted to increase or maximize the average density of points along the visible edges. For example, as shown in FIG. 11, bounding box 810 may be adjusted by moving edges 1010 and 1015 (shown in dashed-line) of bounding box 810 towards the positions of edges 1110 and 1115 (shown in solid line). FIG. 12 depicts both the original bounding box 810 (shown in dashed-line) as well as the adjusted bounding box 1210 (shown in solid line). Although this example demonstrates only adjusting the dimensions (length and width) of the bounding box by changing the visible edges of the bounding box, as noted above, the location, heading, and orientation of the bounding box may also be adjusted.

The adjusted bounding box may then be used to maneuver the vehicle. For example, vehicle 300 may use the adjusted bounding box to make decisions on how to interact or maneuver around the object. By increasing the accuracy of the bounding box, vehicle 300 may have a better idea of the location and heading of the other object. This in turn may give vehicle 300 more room to maneuver itself around the other object and may allow the vehicle to drive more aggressively. Examples of more aggressive driving may include slowing the vehicle down more gradually (as it appears to have more room between the vehicle and the adjusted bounding box) or maneuvering the vehicle more closely to the other object. For example, accurate heading helps us to detect other vehicle cutting into our lane earlier.

Figure 13:
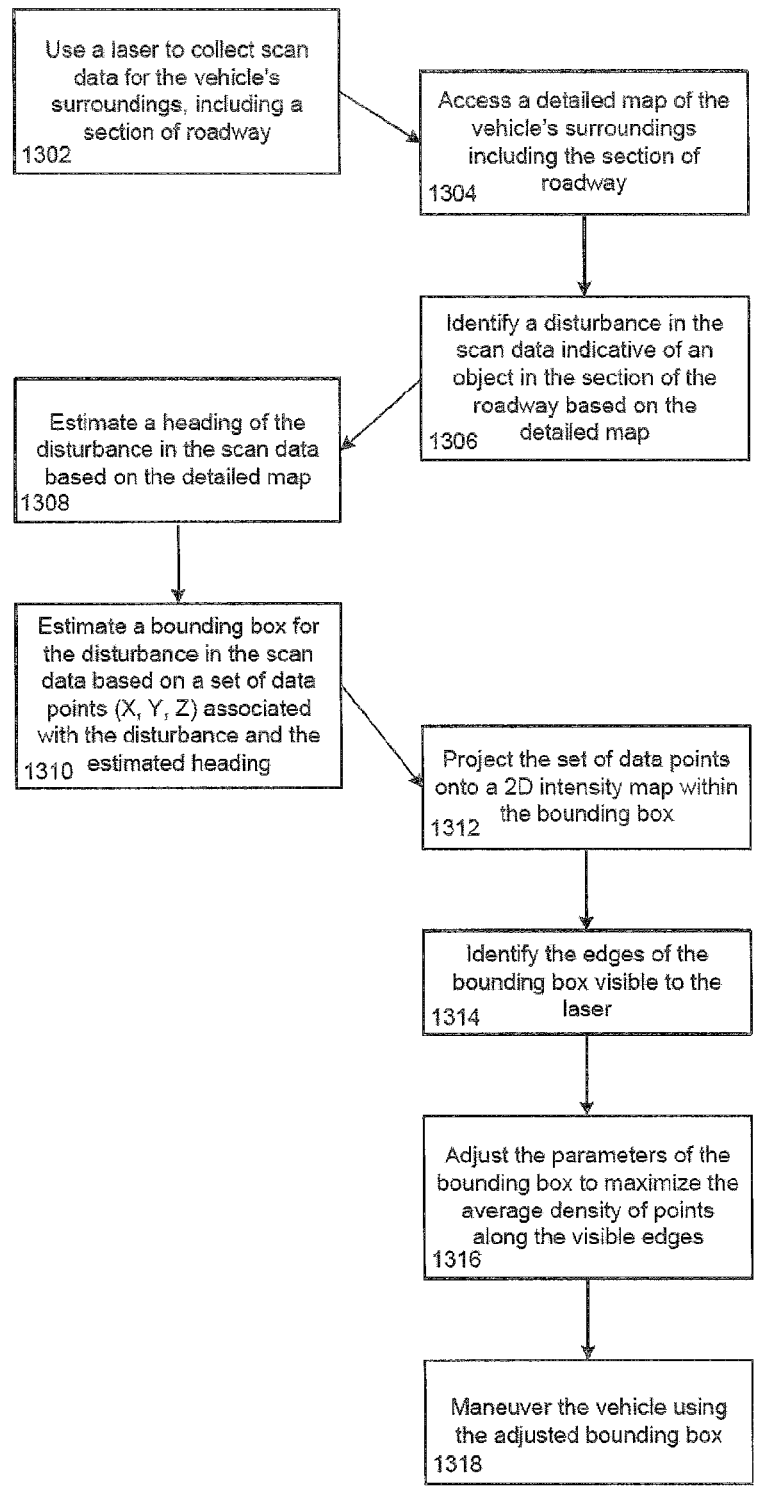
FIG. 13 is a flow diagram in accordance with an implementation.

Flow diagram 1300 of FIG. 13 depicts an example implementation. In this example, a laser collects scan data for the autonomous vehicle's surroundings including some section of a roadway at block 1302. The vehicle also accesses a detailed map including the section of the roadway at block 1304. For example, the detailed map may be identified based on data received from a global positioning component. At block 1306, a disturbance in the scan data is identified based on the detailed map. The disturbance includes a set of data points that are indicative of an object in the section of the roadway. For example, as described above, a set of data points associated with a vertical location at or above some threshold distance from the road surface (as indicated in the detailed map) may be identified as a disturbance. The detailed map is also used to estimate a heading of the disturbance at block 1308.

A bounding box for the set of data points is then estimated using the set of data points of the disturbance as well as the estimated heading at block 1310. The bounding box includes parameters such as position, heading, and dimensions. The set of data points is then projected onto a 2D intensity map within the bounding box at block 1312. The visible edges of the bounding box, or those edges which would be visible to the laser, are then identified at block 1314. The parameters of the bounding box are adjusted in order to increase or maximize the average density of data points of the set of data points of the disturbance along the identified visible edges at block 1316. The adjusted bounding box is then used to maneuver the vehicle 1318.

The adjusted bounding box may also be used to estimate a bounding box for the same object detected during a subsequent laser scan. For example, in addition to the possible direction of travel and the group of data points indicating an object in the roadway from the current laser scan data, the vehicle may also consider the heading, location, orientation, and dimensions of a previous adjusted bounding box to estimate a current bounding box for the object. The data points of the current bounding box may then be processed and the current bounding box adjusted as described above.

Although the examples described above highlight the use of one or more lasers to scan and collect data points and estimate an initial bounding box for an object in the roadway, other sensors may also be used. For example, data received from radar, sonar, cameras, etc. used to detect the state of the vehicle's surroundings may also be used to detect the location and heading of an object in the roadway. This data in turn, may also be used to estimate the initial bounding box as well as to adjust the parameters of the bounding box.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for maneuvering a vehicle, the method comprising:
   selecting, by one or more processors, a set of points from a plurality of data points generated by a sensor, each data point of the plurality of data points representing a three-dimensional location of a point corresponding to a surface of an object located on a section of roadway, the set of points being indicative of an object in the section of roadway;
   estimating, by the one or more processors, a bounding box for the set of points based on a detailed map of the section of roadway;
   projecting, by the one or more processors, the set of data points onto a two-dimensional intensity map within the estimated bounding box;
   identifying, by the one or more processors, an edge of the bounding box visible to the sensor;
   adjusting, by the one or more processors, a parameter of the estimated bounding box in order to increase a number of data points of the set of data points projected along the identified edge; and
   using, by the one or more processors, the estimated bounding box including the adjusted parameter to maneuver the vehicle.

2. The method of claim 1, wherein the sensor includes a laser and the plurality of data points are generated from the laser scanning the section of the roadway.

3. The method of claim 1, wherein the set of data points is further identified by selecting data points of the plurality of data points that satisfy a threshold elevation above a surface of the section of roadway identified in the detailed map.

4. The method of claim 1, further comprising estimating a heading of the set of data points based on the detailed map.

5. The method of claim 4, wherein the detailed map includes information indicating a direction of a lane and estimating the heading is further based on the information indicating the direction of the lane.

6. The method of claim 1, wherein the parameter is adjusted in order to maximize the number of data points of the set of data points along the identified edge.

7. The method of claim 1, wherein the parameter of the estimated bounding box includes a location of the identified edge.

8. The method of claim 1, further comprising:
   receiving additional data points generated by the sensor corresponding to the object; and
   using the estimated bounding box and adjusted parameter to estimate a new bounding box for the object based on the received additional data points.

9. The method of claim 1, further comprising:
   receiving sensor data from a second sensor of a different type from the sensor, and
   wherein the received sensor data from the second sensor is further used to estimate the estimated bounding box.

10. A system for maneuvering a vehicle, the system comprising:
    one or more processors configured to:
    select a set of points from a plurality of data points generated by a sensor, each data point of the plurality of data points representing a three-dimensional location of a point corresponding to a surface of an object located on a section of roadway, the set of points being indicative of an object in the section of roadway;
    estimate a bounding box for the set of points based on a detailed map of the section of roadway;
    project the set of data points onto a two-dimensional intensity map within the estimated bounding box;
    identify an edge of the bounding box visible to the sensor;
    adjust a parameter of the estimated bounding box in order to increase a number of data points of the set of data points projected along the identified edge; and
    use the estimated bounding box including the adjusted parameter to maneuver the vehicle.

11. The system of claim 10, further comprising the vehicle.

12. The system of claim 10, further comprising the sensor, wherein the sensor includes a laser.

13. The system of claim 10, wherein the one or more processors are further configured to identify set of data points by selecting data points of the plurality of data points that satisfy a threshold elevation above a surface of the section of roadway identified in the detailed map.

14. The system of claim 10, wherein the one or more processors are further configured to adjust the parameter in order to maximize the number of data points of the set of data points along the identified edge.

15. The system of claim 10, wherein the parameter of the estimated bounding box includes a location of the identified edge.

16. The system of claim 10, wherein the one or more processors are further configured to:
    receive additional data points generated by the sensor corresponding to the object;
    use the estimated bounding box and adjusted parameter to estimate a new bounding box for the object based on the received additional data points.

17. The system of claim 10, wherein the one or more processors are further configured to:
    receive sensor data from a second sensor of a different type from the sensor, and
    wherein the received sensor data from the second sensor is further used to estimate the estimated bounding box.

18. A tangible computer-readable storage medium on which computer readable instructions of a program are stored, the instructions, when executed by a processor, cause the processor to perform a method of maneuvering a vehicle, the method comprising:
    selecting a set of points from a plurality of data points generated by a sensor, each data point of the plurality of data points representing a three-dimensional location of a point corresponding to a surface of an object located on a section of roadway, the set of points being indicative of an object in the section of roadway;
    estimating a bounding box for the set of points based on a detailed map of the section of roadway;
    projecting the set of data points onto a two-dimensional intensity map within the estimated bounding box;
    identifying, by the one or more processors, an edge of the bounding box visible to the sensor;
    adjusting a parameter of the estimated bounding box in order to increase a number of data points of the set of data points projected along the identified edge; and
    using the estimated bounding box including the adjusted parameter to maneuver the vehicle.

19. The medium of claim 18, wherein the one or more processors are further configured to adjust the parameter in order to maximize the number of data points of the set of data points along the identified edge.

20. The medium of claim 18, wherein the method further comprises:

receiving additional data points generated by the sensor corresponding to the object; and using the estimated bounding box and adjusted parameter to estimate a new bounding box for the object based on the received additional data points.

\* \* \* \* \*